Jan. 23, 1962  R. KREMP ETAL  3,017,805
PROJECTOR
Filed Dec. 4, 1958  3 Sheets-Sheet 1

INVENTORS
RUDOLF KREMP
PAUL FROST
BY

Jan. 23, 1962   R. KREMP ETAL   3,017,805
PROJECTOR
Filed Dec. 4, 1958
3 Sheets-Sheet 2

INVENTORS
RUDOLF KREMP
PAUL FROST
BY
Connolly and Hutz

Jan. 23, 1962   R. KREMP ETAL   3,017,805
PROJECTOR
Filed Dec. 4, 1958
3 Sheets-Sheet 3

INVENTORS
RUDOLF KREMP
BY   PAUL FROST

United States Patent Office
3,017,805
Patented Jan. 23, 1962

3,017,805
PROJECTOR
Rudolf Kremp and Paul Frost, Munich, Germany, assignors to Agfa Aktiengesellschaft, Leverkusen-Bayerwerk, Germany, a corporation of Germany
Filed Dec. 4, 1958, Ser. No. 778,216
Claims priority, application Germany Jan. 11, 1958
2 Claims. (Cl. 88—26)

This invention relates to a device for projecting a light image, and more particularly relates to such a device for projecting an image by passing a beam of light through a transparency.

When projecting images from transparencies, it is frequently desirable to view certain interesting details in a larger magnification than that which is produced by the normal image projecting lens. An object of this invention is, accordingly, to provide a means for projecting certain portions of a transparency with a greater magnification than provided by the normal lens of a projector.

In accordance with this invention, supplemental optical devices are provided upon a projector. These supplemental devices are selectively insertable into the path of the projecting rays, and they are capable of adjustment in different directions perpendicular to the optical axis of the projector for magnifying selected portions of the images. These supplemental devices are arranged at least partially between the transparency and the projecting lens.

In a preferred embodiment of this invention, an image magnifying lens is mounted upon a carrier which is adjustable vertically and horizontally relative to the optical axis of the projector and disposed between the transparency and the projecting lens. For example, this magnifying lens is mounted to move vertically in a relatively small frame which in turn slides horizontally within a larger frame. An adjusting element is operatively associated with the relatively small and larger frames to permit the vertical and horizontal positions of the magnifying lens to be regulated thereby.

Furthermore, additional optical elements may be provided for insertion between the light source and transparency for increasing the brightness of the selected area of the slide to be magnified. These additional elements may also be adjusted horizontally and vertically with respect to the path of the projection rays. A combined adjusting device for the magnifying optical elements and the additional elements may be provided for simultaneously adjusting them within the path of the light rays. These magnifying elements and additional optical elements may accordingly be arranged upon a combined carrier.

A projector incorporating this invention provides the advantage of permitting selective magnifying projection of all parts of a transparency. Furthermore, it may be operated very easily even by untrained personnel.

Novel features and advantages of the present invention will become apparent to one skilled in the art from a reading of the following description in conjunction with the accompanying drawings wherein similar reference characters refer to similar parts and in which.

Figure 1:
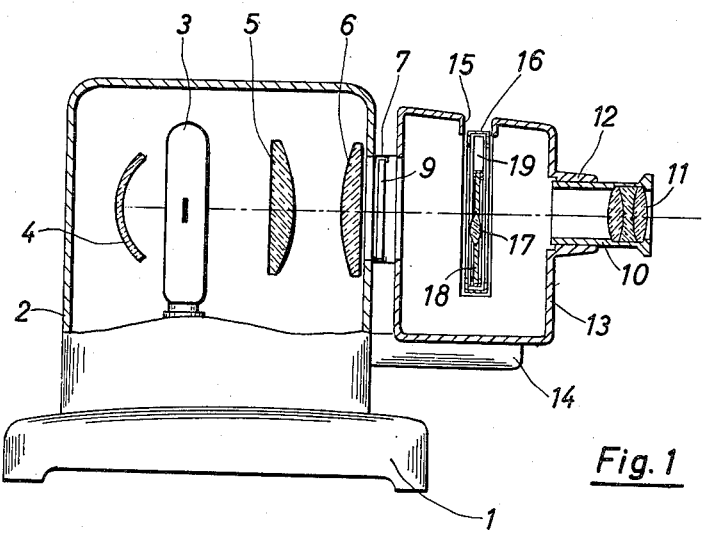
FIG. 1 is a view in elevation partially broken away in cross-section of an embodiment of this invention in one phase of operation.
Figure 2:
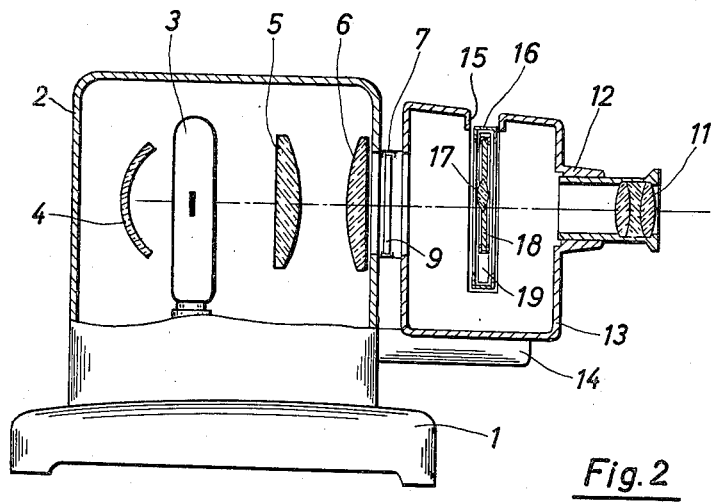
FIG. 2 is a view similar to FIG. 1 in another phase of operation.
Figure 3:
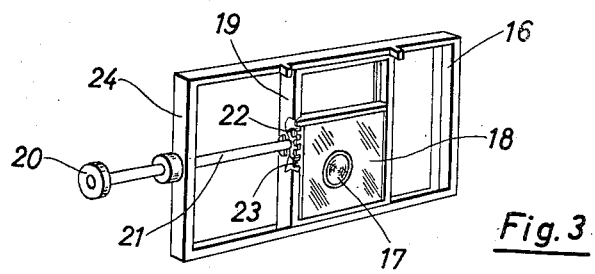
FIG. 3 is a perspective view of a portion of the embodiment shown in FIGS. 1 and 2.
Figure 4:
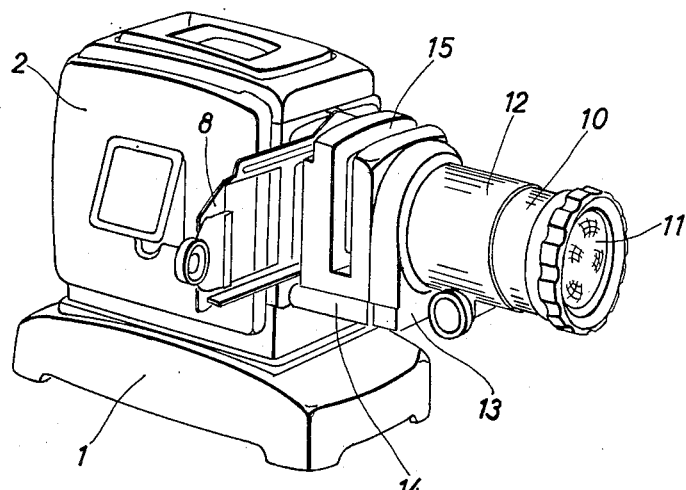
FIG. 4 is a perspective view of another portion of the embodiment shown in FIGS. 1 and 2.

In FIGS. 1–4, a lamp housing 2 is mounted upon the base 1 of a slide projector. Within housing 2 are mounted projection lamp 3 with mirror 4 disposed behind it and condenser lenses 5 and 6 disposed in front of it. A lens carrier 13 is detachably mounted upon extensions 14 of lens housing 2, and guide channels 7 are mounted between lamp housing 2 and lens carrier 13. As shown in FIGS. 1 and 4, transparencies which are for example, slides 9 are inserted within frame 8 which is mounted between channels 7. Lens tube 10 carrying projecting lens 11 is inserted within tubular mount 12 which is in turn mounted upon lens carrier 13.

Lens carrier 13 also includes a slot-shaped channel 15 within which is mounted frame 16 carrying supplemental and magnifying lens 17. Supplemental lens 17 is mounted, for example, in a mask 18 which is mounted to slide in a vertical direction within a relatively small frame 19. It is apparent that a light transparent, partially light transparent, or non-transparent element may be used to form mask 18 for magnifying lens 17. Small frame 19 is in turn mounted within a relatively larger frame 16 and slides horizontally within it in a manner later described. Knob 20 is provided for regulating the position of magnifying lens 17, and it accordingly is attached to a shaft 21 incorporating a pinion 22 which engages a rack 23 formed in the side of mask 18. Small frame 19 together with the magnifying lens is accordingly adjusted in a horizontal direction, within outer frame 16 by moving knob 20 and its shaft in a horizontal direction, and the vertical position of lens 17 is adjusted by turning knob 20 to move mask 18 through shaft 21, pinion 22 and rack 23 in a vertical direction within small frame 19.

Frame 16 extends far enough to both sides of channel 15 in lens carrier 13 to permit magnifying lens 17, mask 18 and small frame 19 to be positioned outside of the path of the projected rays when small frame 19 and inserted mask 18 are moved against the side 24 of frame 16, which side is shown in FIG. 3. In this extreme position, a slide 9 inserted within carrier 8 and thereby inserted within the path of the projected light rays is projected at normal magnification by projecting lens 11 without interference from lens 17 or its associated elements.

However, if it is desired to magnify a particularly interesting section of a slide 9, knob 20 is rotated and translated to insert supplemental or magnifying lens 17 in front of the portion of the slide 9 which it is desired to magnify.

Appropriate adjustment of knob 20 permits magnifying lens 17 to be positioned in front of any predetermined section of slide 9. In FIG. 1, for example, lens 17 is shown in a position where it projects a section of the lower portion of slide 9; and in FIG. 2, for example, lens 17 is adjusted to project a magnified image of a section of the upper area of slide 9. When projecting lens 11 is adjusted in accordance with the focal length of magnifying lens 17, the selected portion of slide 9 is portrayed on the screen in larger magnification than the projected image of the entire slide before the interposition of magnifying lens 17.

Figure 5:
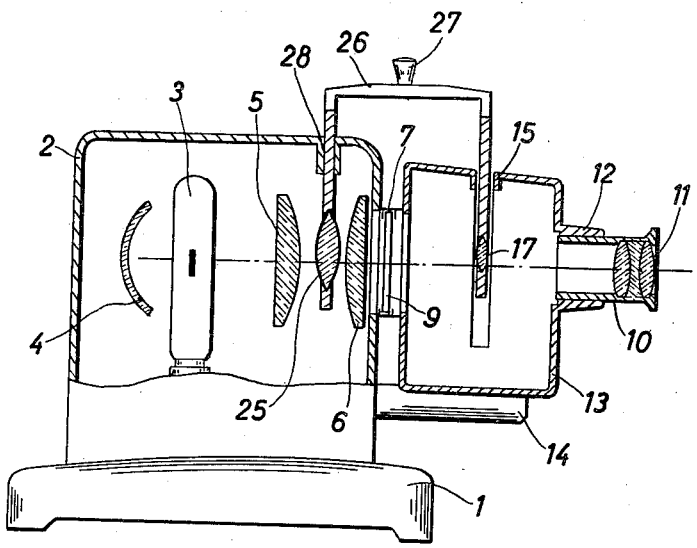
FIG. 5 is a view in elevation partially broken away in cross-section of a further embodiment of the invention.

When magnifying lens 17 is interposed in the path of the projected rays, the brightness of the magnified image on the screen is decreased from that of the normal image. This decrease in brightness can be compensated by inserting additional optical devices or elements into the path of the rays together with magnifying lens 17. For example, an auxiliary light concentrating lens 25 cooperable with condenser lens 5 and 6 may be placed in the path of the illuminating rays between projection lamp 3 and slide 9, as shown in FIG. 5. This auxiliary lens 25 is, for example, vertically and horizontally adjustable with respect to the path of illuminating rays in accordance with the shifted position of lens 17 to increase the brightness of the magnified portion of the slide and thereby, compensate for the loss in brightness caused by its image magnifying action.

Lens 17 and the additional brightening optical element 25 are preferably arranged upon a combined carrier 26 for insertion and movement together within the path of the projecting and illuminating light rays. This carrier 26 may be formed in a forked shape and comprises a handling element 27 for moving said carrier and, therefore, for adjusting both the magnifying lens 17 and the light-concentrating element 25. The forked carrier 26 may be moved in channels 15, 28 of the housing of the projector against friction.

What is claimed is:

1. A projector comprising a source of light, a projecting lens, means for mounting a picture transparency between said source of light and said projecting lens, means for movably mounting a magnifying optical element between said means for mounting a picture transparency and said projecting lens said movable mounting means being adjustable in different directions to permit any selected area of said transparency to be magnified, said magnifying element including a magnifying lens mounted upon a carrier which is movably interposed between said means for mounting a picture transparency and said projecting lens, adjusting means being provided for moving said carrier in different directions perpendicular to the optical axis of said projector, light concentrating elements being disposable between said light source and said transparency to be projected within the path of illuminating light rays, said light concentrating elements being movable in different directions in accordance with the position of said magnifying element for increasing the brightness of said selected area of said transparency being projected to compensate for the loss of brightness which occurs when a magnified image of said selected area is projected, and a single adjusting device being provided for simultaneously adjusting the positions of said magnifying element and said light concentrating element in line with each other within the path of said projecting light rays and said illuminating light rays.

2. A projector as set forth in claim 1 wherein said light concentrating element and said magnifying element are mounted upon a combined carrier, and said combined carrier is mounted upon said projector in a manner permitting it to be adjusted in different directions perpendicular to the optical axis of said projector.

References Cited in the file of this patent

UNITED STATES PATENTS

| | | |
|---|---|---|
| 1,832,739 | Del Riccio | Nov. 17, 1931 |
| 2,334,329 | Isaacson | Nov. 16, 1943 |
| 2,810,320 | Polin | Oct. 22, 1957 |